United States Patent [19]
Calhan

[11] 3,797,353
[45] Mar. 19, 1974

[54] MEAT FEEDING MACHINE
[75] Inventor: Richard B. Calhan, Warsaw, Ind.
[73] Assignee: Creative Inc., Warsaw, Ind.
[22] Filed: Feb. 18, 1972
[21] Appl. No.: 227,357

[52] U.S. Cl............... 83/718, 83/730, 83/431
[51] Int. Cl......... B26d 1/28, B26d 4/36, B26d 5/42
[58] Field of Search............ 83/425, 431, 435, 718, 83/719, 730, 435.2

[56] References Cited
UNITED STATES PATENTS
| | | | |
|---|---|---|---|
| 1,977,463 | 10/1934 | Van Duyn | 83/730 |
| 1,622,609 | 3/1927 | Quinn | 83/730 |
| 3,613,754 | 10/1971 | Hartley | 83/718 |

Primary Examiner—Willie G. Abercrombie
Attorney, Agent, or Firm—Woodhams, Blanchard and Flynn

[57] ABSTRACT

A first slide is reciprocably supported upon a base for horizontal movement past an adjacent saw blade. A second slide is reciprocably supported upon the first slide for horizontal movement toward and away from the saw blade. Meat advancing means is mounted upon the second slide for intermittently moving the meat in small increments toward the saw blade. Actuating means supported upon the base effects said reciprocal movement of the slides so that the second slide moves in a rectangular path. Drive means supported upon the second slide means and the first slide means effects the periodic and incremental movement of the meat advancing means each time the second slide moves through the rectangular path.

9 Claims, 17 Drawing Figures

PATENTED MAR 19 1974

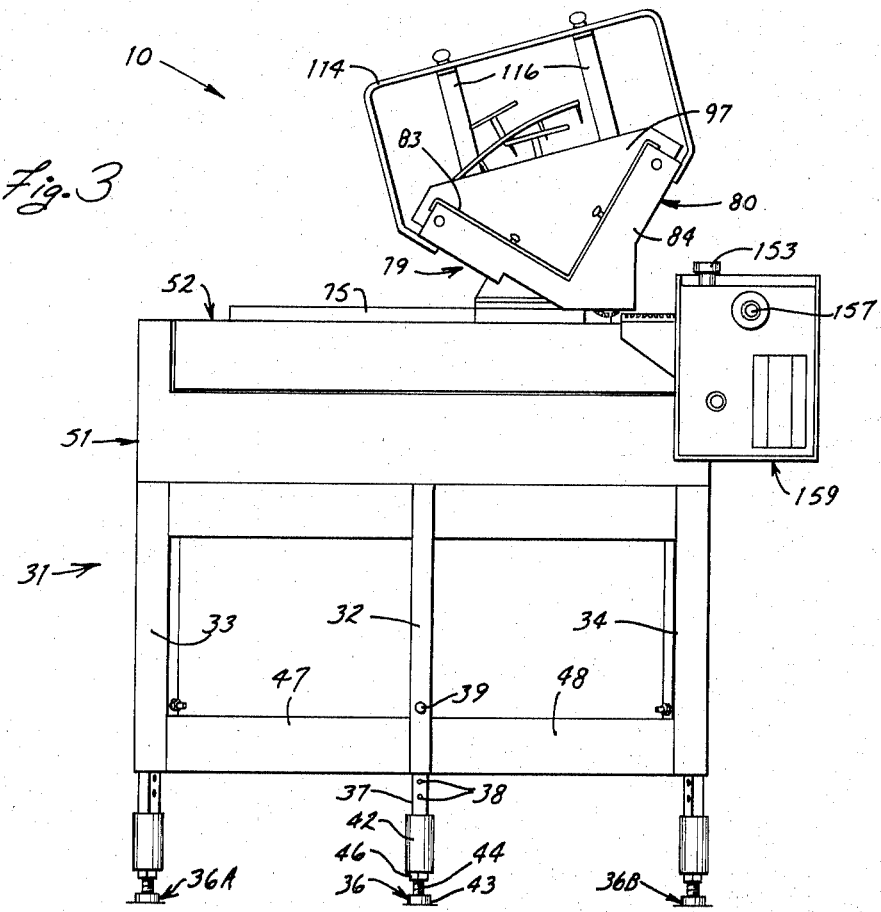
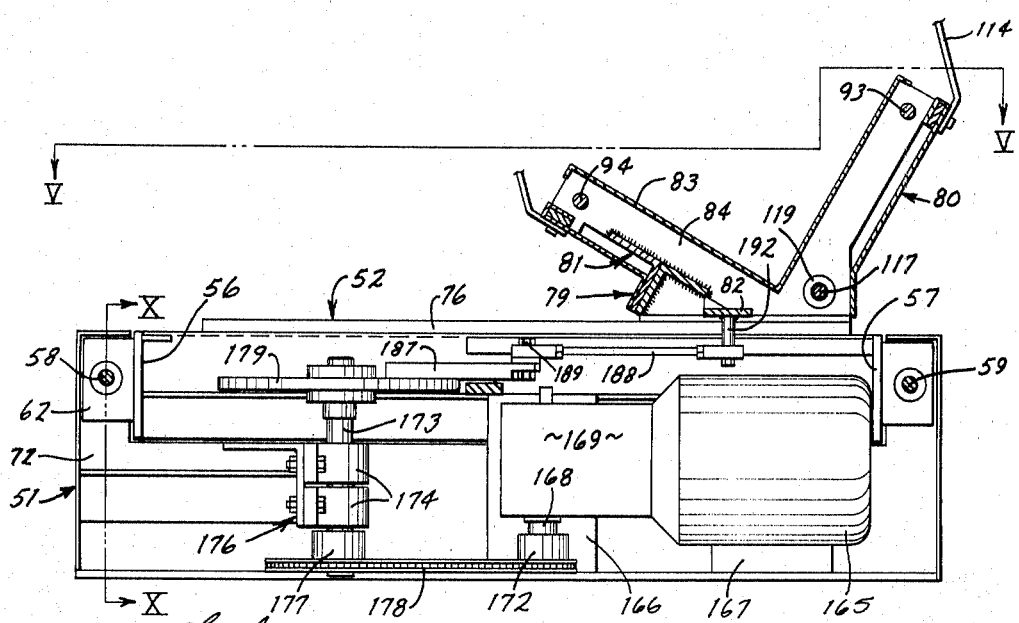

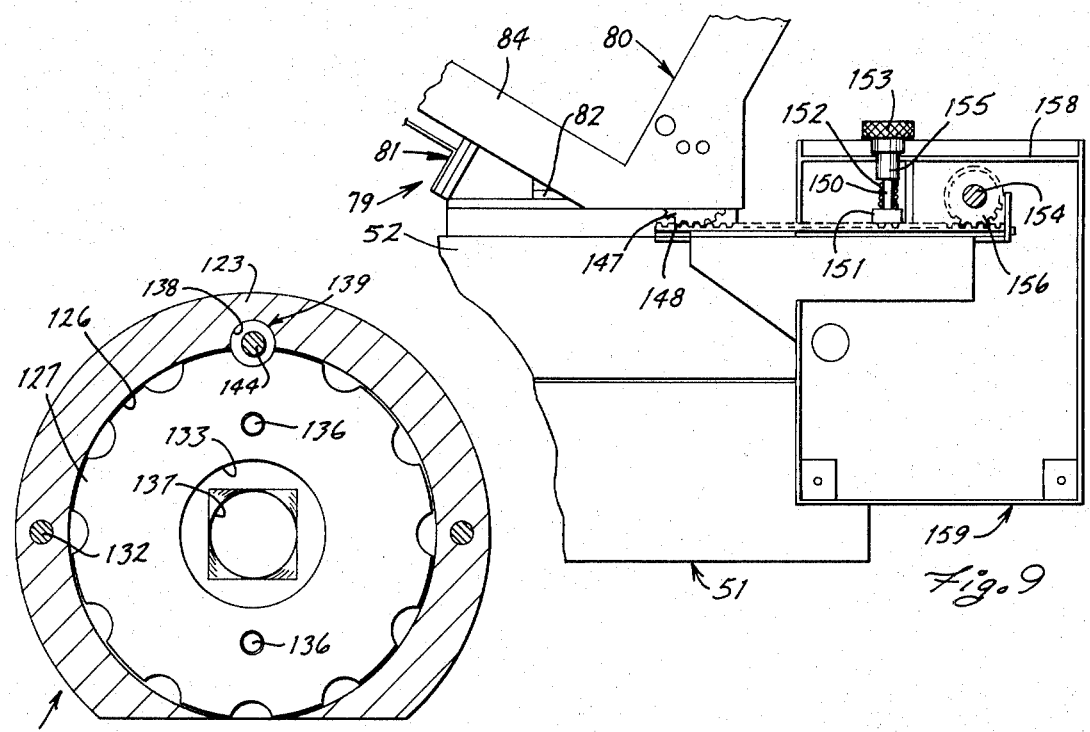
Fig. 9
Fig. 12
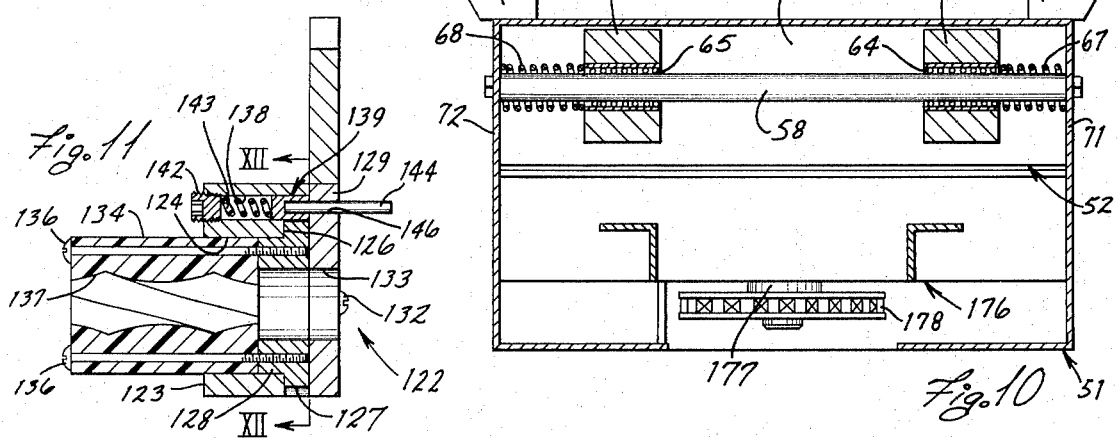
Fig. 11
Fig. 10
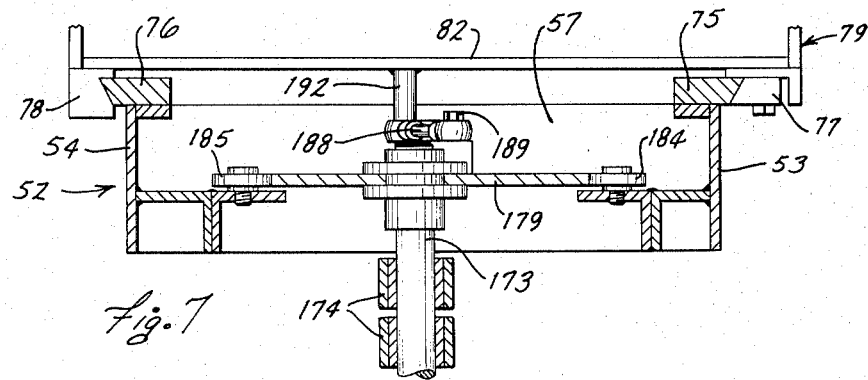
Fig. 7

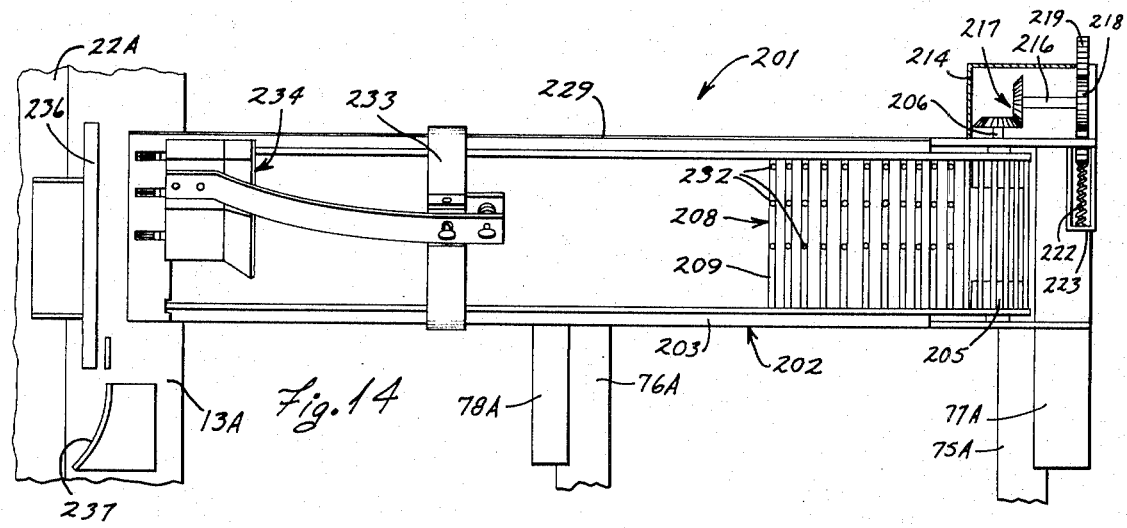
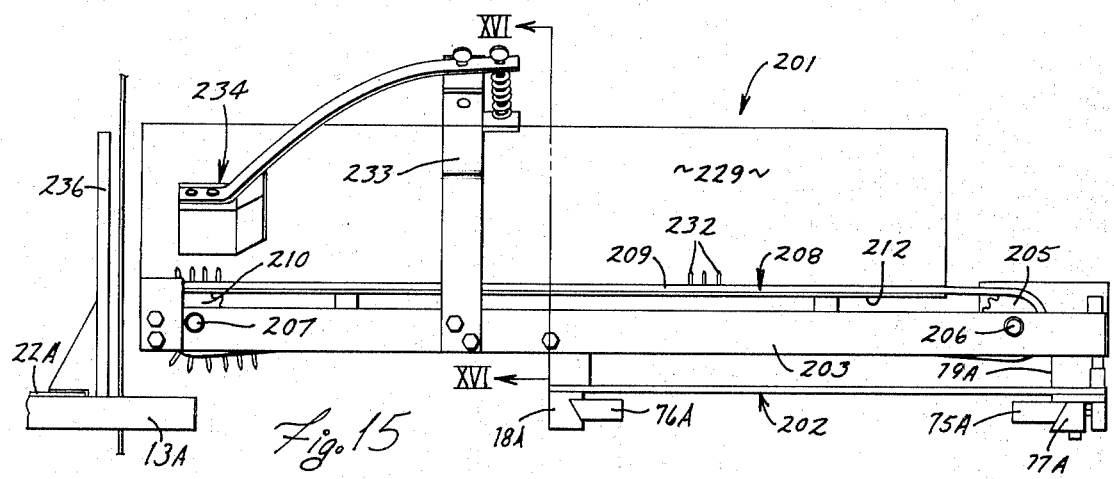
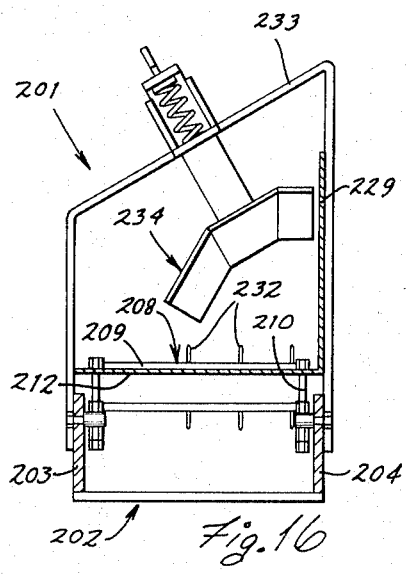

MEAT FEEDING MACHINE

BACKGROUND OF THE INVENTION

This invention relates in general to an apparatus for automatically sawing or cutting an object into slices thereof after which the slices are removed from the cutting zone and, more particularly, to a machine adapted for combination with a bandsaw whereby a large piece of meat is moved cyclically through a path in which slices are intermittently cut from the piece of meat by the bandsaw blade.

It has for many years been common practice to precut meat into marketable slices which are then packaged and placed in open top or open front coolers or refrigerators for quick and easy access by customers, as in a supermarket. This arrangement permits more efficient utilization of skilled butchers who would otherwise be required to cut and wrap the meat as it is ordered.

In by far the majority of situations, the sliced meat is placed in moisture proof or semi-moisture proof packages in order to give it a longer shelf life, to minimize contamination, and to avoid messiness in handling by customers. The packaging of the cut meat has been widely accomplished by automatic machinery to avoid contamination and to minimize the time of handling. However, it has been common knowledge for a considerable time that the packaging equipment could handle the cut meat at a faster rate than it could heretofore be cut be existing equipment and techniques which, in most instances, have involved a substantial number of manual operations.

Moreover, because the meat slicing and cutting operation has required considerable strength, due to cutting through bones and the like, it has severely limited the type of personnel who can perform butchering operations. Also, because of excessive manual handling of the meat in most previous instances, during the cutting and packaging operation, it has been necessary to exercise careful supervision over the cleanliness and health of the meat handlers to avoid contamination of the product.

It is well known that the mere exercise of care is not enough to avoid contamination because, for example, human beings can pass on a communicable disease before they are aware that they have the disease.

In view of the foregoing, it has been long recognized that there is a need for a completely automatic apparatus for receiving a large piece of meat and thereafter automatically slicing the meat and conveying it to a packaging machine and, accordingly, a primary object of this invention is the provision of such an apparatus.

A further object of this invention is the provision of a machine for receiving a large piece of meat and feeding such meat automatically to another machine for cutting the meat into slices in which case the cutting machine could be independent and could be preexisting at the point of use.

A further object of this invention is the provision of a meat feeding apparatus, as aforesaid, in which the amount of advancement of the meat can be easily adjusted in order to change the thickness of slices produced by the slicing machine.

A further object of this invention is the provision of a meat feeding and cutting apparatus, as aforesaid, in which a large piece of meat can be converted automatically to slices without any manual assistance.

Other objects and purposes of this invention will become apparent to persons familiar with this type of equipment upon reading the following descriptive material and examining the accompanying drawings, in which:

FIG. 3 is a front end elevational view of said meat feeding machine.

FIG. 4 is a sectional view substantially as taken along the line IV—IV in FIG. 2.

FIG. 7 is a sectional view taken along the line VII—VII in FIG. 5.

FIG. 9 is an enlarged fragment of FIG. 3.

FIG. 10 is a sectional view taken along the line X—X in FIG. 4.

FIG. 11 is a sectional view taken along the line XI—XI in FIG. 5.

FIG. 12 is a sectional view taken along the line XII—XII in FIG. 11.

FIG. 14 is a top plan view of a fragment of said feeding and cutting apparatus showing a modified meat advancing mechanism.

FIG. 15 is a side elevation of the fragment illustrated in FIG. 14.

FIG. 16 is a sectional view taken along the line XVI-XVI in FIG. 15.

FIG. 17 is a front end elevation of the fragment illustrated in FIG. 14.

Figure 1:
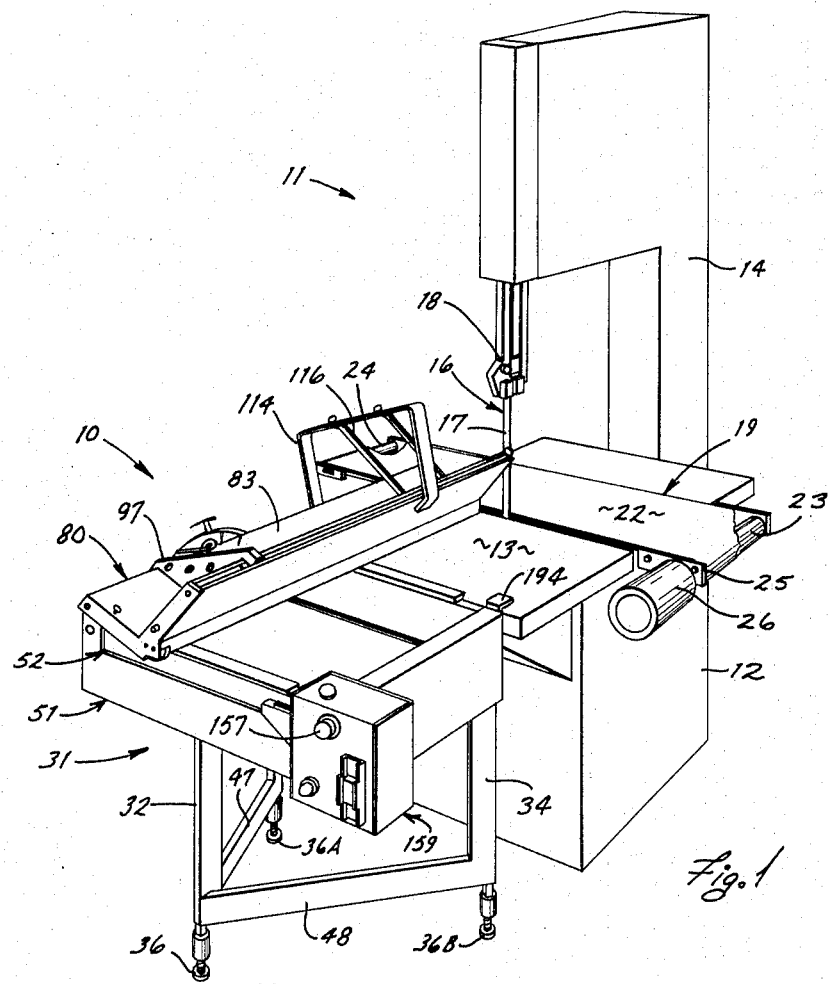
FIG. 1 is a perspective view of an apparatus involving the invention and including a meat feeding machine and a meat sawing machine.

For convenience of description, the terms "upper," "lower," "right," "left," and words of similar import will have reference to the apparatus, or the machines thereof, as appearing in FIG. 1 which illustrates the front and right sides thereof. The terms "inner," "outer," and derivatives thereof will have reference to the geometric center of said machines and parts thereof.

SUMMARY OF THE INVENTION

The objects and purposes of the invention, including those set forth above, have been met by providing a first slide supported upon a base adapted to be placed adjacent a bandsaw machine having a vertically disposed section of saw band or blade. A second slide is reciprocably supported upon the first slide for horizontal movement toward and away from the saw band, the first slide being reciprocable in a horizontal direction perpendicular to the direction of movement of the second slide. An elongated meat support is mounted upon the second slide and has advancing means for moving the meat in small increments lengthwise of the support toward the saw band. Actuating means supported upon the base effects said reciprocable movement of the two slides relative to each other and relative to the base whereby the meat support moves in a rectangular path which is elongated transversely of the meat support. Drive means supported upon the first and second slide means effects the incremental movement of the meat advancing means each time the meat support approaches one lengthwise end of its rectangular path.

In one embodiment, the meat support is an elongated upwardly opening trough and the advancing means includes a plate which is moved by the drive means along the trough. In another embodiment, the support means includes structure for supporting an endless conveyor having two substantially horizontal reaches, the upper of which supports the meat. The conveyor is connected to the drive means for incremental periodic advancement of the upper reach of the conveyor toward the saw band.

DETAILED DESCRIPTION

The apparatus shown in FIG. 1, which comprises a preferred embodiment of the invention, includes a feeding machine 10 and a sawing machine 11, the elements of which cooperate to convert automatically a large chunk of meat 15, for example, into slices 20 of uniform thickness which are then delivered by the apparatus to another station where the slices can be given additional treatment and wrapped.

The sawing machine is comprised of a pedestal 12 supporting a table 13 and an upright, L-shaped column 14. In this particular embodiment, a saw blade or band 16 is supported by and mostly within the pedestal 12 and column 14 in a substantially conventional manner. The band 16 has an exposed, upright portion 17 which extends upwardly from the table 13 and then through a guide 18 which is supported by the front end of the column 14. Up to this point, the sawing machine 11 can be of a conventional type which is usually referred to as a "bandsaw."

A conveyor 19 is mounted upon the table 13 and has an endless belt 22 which extends transversely of the table 13 in a direction parallel with the plane defined by said portion 17 of said band 16. That is, the toothed edge of the band 16 faces toward one end of the conveyor belt 22 and the smooth edge of the band 16 faces the opposite end of the belt.

The belt 22 is supported upon and between rollers 23 and 24 which are rotatably supported upon the conveyor frame 25. The roller 23 is connected to the shaft of the motor 26 which is supported upon the frame 25 and connected to a source of electrical potential. The conveyor 19 is located on the rear side of and adjacent to the portion 17 of the saw band.

The feeding machine 10 (FIG. 3) has a base 31 which is comprised of three upright legs arranged in a triangle so that there is a front leg 32 and two rear legs 33 and 34. The legs 32, 33 and 34 have identical adjustable feet 36, 36A and 36B.

The foot 36, which will be described in detail, is connected to the lower end of an elongated member 37 which is slidably supported upon the lower portion of the leg 32. The member 37 has a plurality of openings 38, each of which is alignable with a corresponding opening in the leg 32 through which a bolt 39 extends for holding the member 37 in one of several lengthwise positions relative to the leg 32.

An internally threaded sleeve 42 is rigidly secured to the lower end of the member 37 and a guide 43 has an integral, threaded shank 44 threadably received upwardly into the sleeve 42. A lock nut 46 holds the shank 44 in a selected position relative to the sleeve 42.

The feet 36A and 36B may be, and preferably are, identical to the foot 36 so that detailed description thereof is unnecessary.

Figure 2:
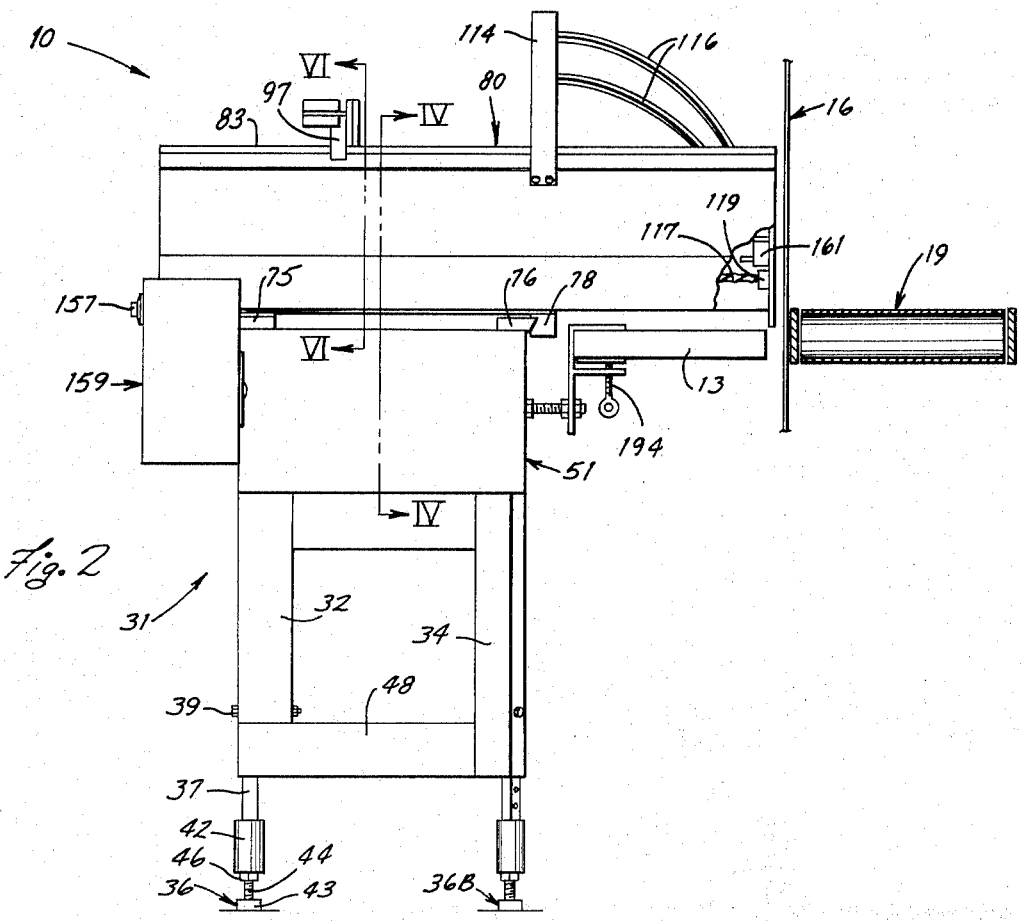
FIG. 2 is a side elevational view of said meat feeding machine and a fragment of said meat sawing machine.

The legs 33 and 34 are connected to the front leg 32 by cross bars 47 and 48, respectively, just above the feet 36, 36A and 36B. A slide support frame 51, which is substantially rectangular in shape, is rigidly secured to the upper ends of and supported upon the legs 32, 33 and 34 so that the rear side of said frame 51 (FIG. 2) is substantially parallel with and close to a plane defined by the rear edges of the rear legs.

Figure 13:
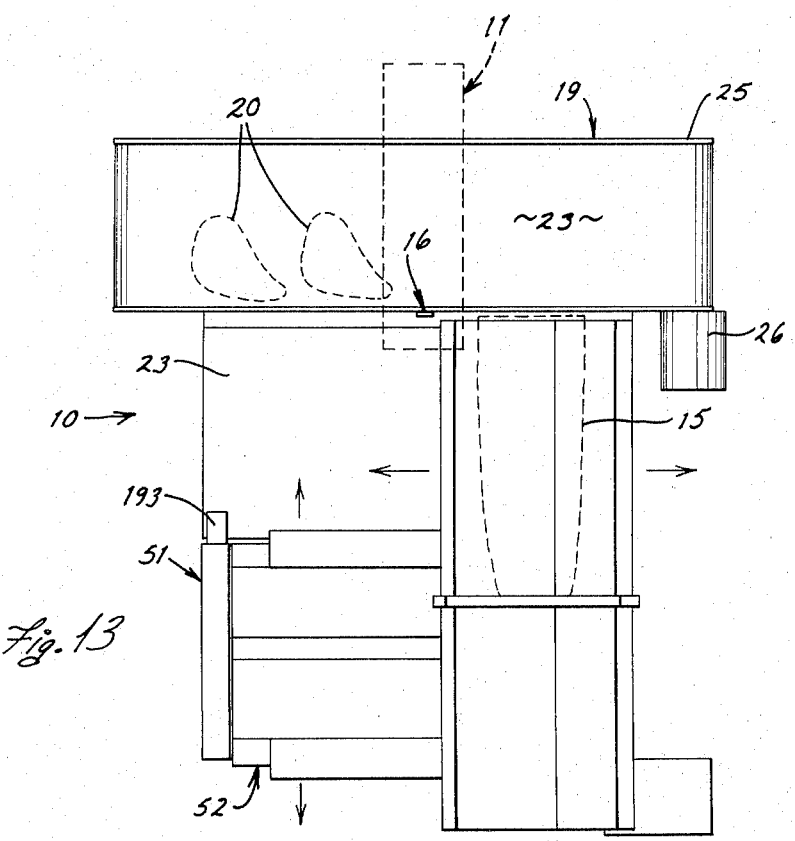
FIG. 13 is a diagrammatic, top plan view of the meat feeding and cutting apparatus for illustrating the operation of the feeding machine.

A lower slide 52 (FIG. 7) is comprised of lengthwise side members 53 and 54 and crosswise end members 56 and 57 (FIG. 4) which are rigidly secured together to form a rectangular structure disposed within the frame 51. A pair of horizontal slide bars 58 and 59 are rigidly supported within the frame 51 adjacent to and parallel with the opposite end members 56 and 57 of the lower slide. A pair of bearing supports, such as those shown at 62 and 63 in FIG. 10, are rigidly secured to each end member 56 and 57 and contain bearings 64 and 65 which, for example, surround the slide bar 58 whereby the lower slide 52 is supported for reciprocal movement toward and away from the front side of the sawing machine 11 (FIG. 13).

A pair of spiral springs 67 and 68 (FIG. 10) are sleeved upon the slide bar 58 on the remote sides of the bearing supports 62 and 63, respectively. The spring 67 and 68 also bear, respectively, against the front wall 71 and the rear wall 72 of the frame 51. Since the spiral springs 67 and 68 are under slight compression, they tend to resist movement of the lower slide 52 away from the centered position within the frame 51. In this centered position, the outside surface of the front side member 53 (FIG. 7) of the lower slide 52 is flush with the outer surface of the front wall 71 (FIG. 10) of the slide frame 51, and the rear side of the rear side member 54 of the lower slide 52 is flush with the rear surface of the rear wall 72 of the frame 51.

Figure 5:
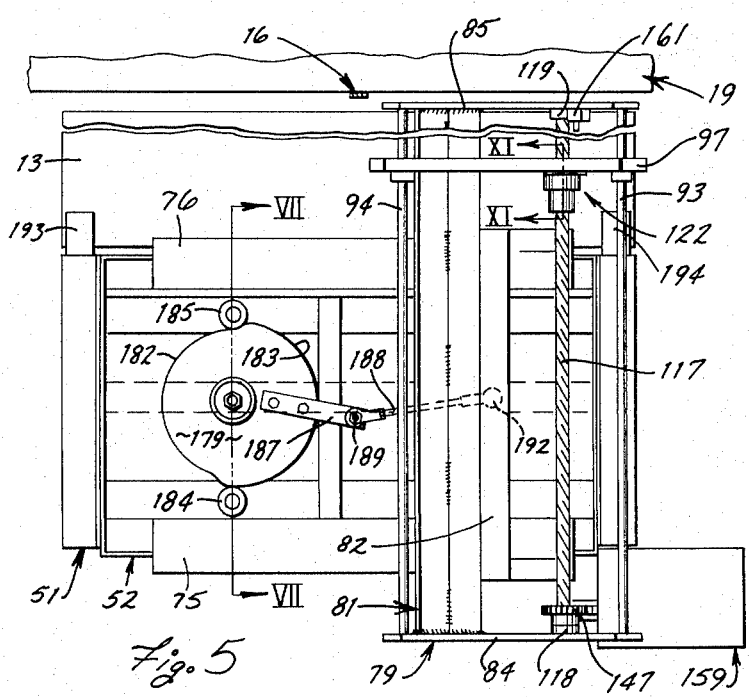
FIG. 5 is a sectional view substantially as taken along the line V—V in FIG. 4 with the meat hopper removed.

A pair of elongated slide guides 75 and 76 (FIG. 7) are secured upon the upper edge of the front and rear side members 53 and 54, respectively, of the lower slide 52. These slide guides may be of the gib type and they are engaged by slides 77 and 78, respectively, which are secured to the lower side of the upper slide 79. Whereas, the lower slide 52 (FIG. 5) is arranged to move a relatively short distance, transversely of the frame 51, the upper slide 79 is arranged to move lengthwise along the lower slide 52 from one end to the ohter.

The upper slide 79 comprises a support member 81 which comprises a pair of angle irons which are welded together and which are connected to and extend transversely between the shoes 77 and 78. In this particular embodiment, the support member 81 extends slightly beyond the front end of the frame 51 but very substantially beyond the rear end of the frame 51. Thus, the member 81 will extend across the front part of the table 13 of the sawing machine 11 when the feeding machine 10 is placed in front of the sawing machine 11. A support bar 82 is also connected between the shoes 77 and 78.

Figure 6:
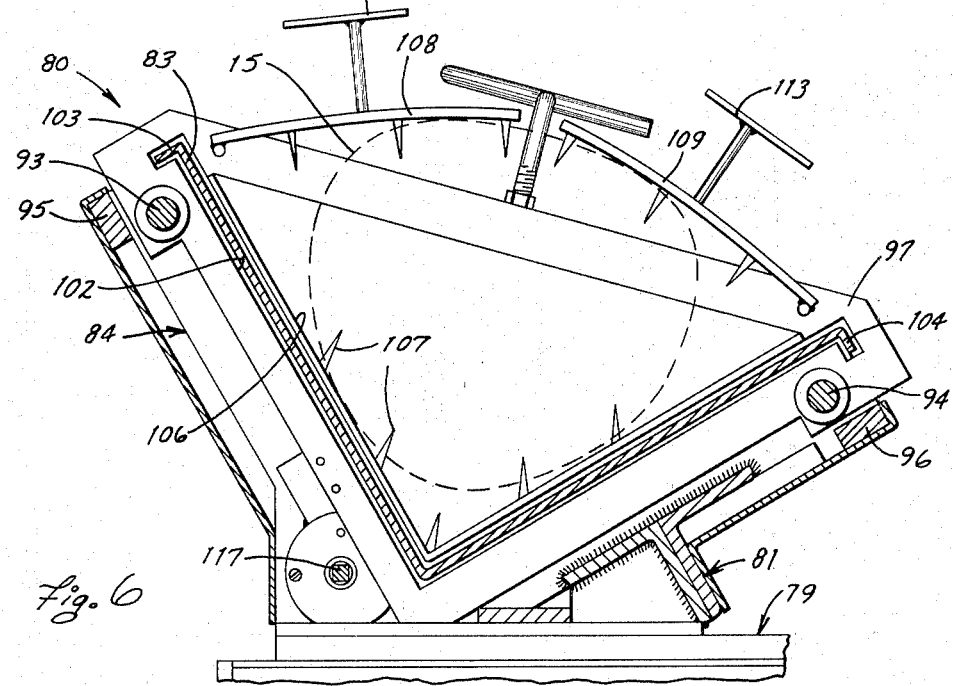
FIG. 6 is a sectional view taken along the line VI—VI in FIG. 2.
Figure 8:
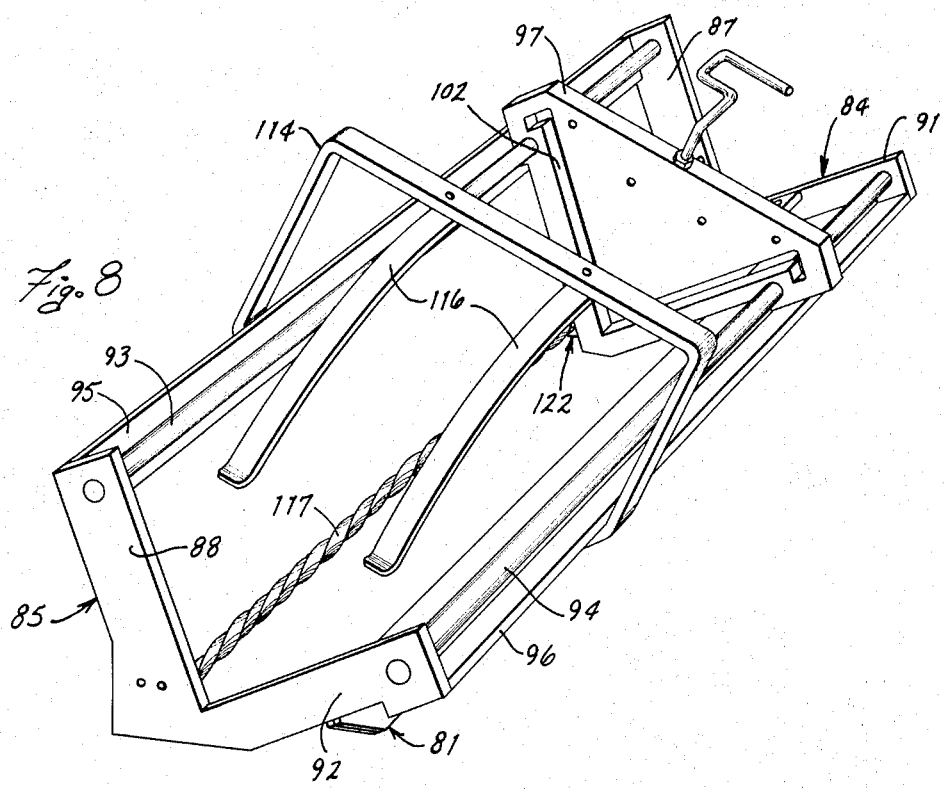
FIG. 8 is a perspective view of the meat support, the opposite perspective of which appears in FIG. 1.

This particular version of the feeding machine 10 (FIGS. 1 and 6) has a feeding mechanism 80 including an upwardly opening trough 83 which is supported upon and extends lengthwise of the support member 81. More specifically, a pair of L-shaped end plates 84 and 85 (FIG. 5) are secured, as by welding, to the front and rear ends, respectively, of the support member 82 so that all of the legs of said end plates are at angles to both the horizontal and the vertical. The legs 87 and 88, respectively (FIG. 8) of the end plates 84 and 85 are at a somewhat steeper slope than the other legs 91 and 92 for operational reasons.

A pair of elongated parallel slide bars 93 and 94 (FIG. 8) are rigidly secured to and extend between the upper ends of the legs 87, 88 and the legs 91, 92, respectively, of the end plate 84 and 85. Brace bars 95 and 96 are rigidly secured to and extend between the legs 87, 88 and 91, 92, respectively. A triangularly shaped pusher plate 97 has a pair of slides 98 and 99 connected thereto near the opposite ends of the upper edge through which the slide bars 93 and 94 extend to support the pusher plate 97 for movement lengthwise of said slide bars.

The pusher plate 97 has an upwardly opening V-shaped slot 102 extending transversely therethrough to receive the trough 83 which also has a V-shaped cross section. The trough 83 has integral outwardly projecting flanges 103 and 104 along its upper edges which project over and cover the slide bars 93 and 94, respectively.

The pusher plate 97 (FIG. 6) has a rearwardly projecting, V-shaped flange 106 which is parallel with, close to and spaced inwardly from the trough 83. A plurality of pointed pins 107 are secured to and extend upwardly from the flange 106 for engaging the adjacent end of the meat 15. A pair of elongated spiked clamps 108 and 109 are pivotally mounted near one end of which on the rear side of the pusher plate 97 adjacent the opposite ends of the upper edge thereof and above the flange 106. The clamps 108 and 109 are movable around horizontal, parallel axes upwardly and downwardly for engagement with said meat. Handles 112 and 113 are secured to the clamps 108 and 109 for effecting their movement. A U-shaped bar 114 is mounted in an inverted position by having the free ends of its legs rigidly secured to the brace bars 95 and 96 approximately midway between the opposite ends thereof. One or more resiliently flexible pressure strips 116 are secured near one end of each to the bight of the bar 114 and extend downwardly and rearwardly therefrom to engage and thereby urge the meat 16 downwardly against the trough 83.

An elongated screw 117 (FIG. 5) extends between and is rotatably supported upon lower portions of the end plates 84 and 85 by means of bearings 118 and 119. A nut assembly 122 (FIG. 11) is mounted upon the pusher plate 97 and the screw 117 extends threadably therethrough. Accordingly, when the screw 117 is rotated, the pusher plate 97 is moved lengthwise of the trough 83.

The nut assembly 122 (FIG. 11) is comprised of a head 123 having a cylindrical opening 124 with a portion 126 of enlarged diameter. A gear 127 has a hub 128 which extends into one end of the cylindrical opening 124, the gear teeth being located in the enlarged portion 126. A cover plate 129 is secured by screw 132 to that end of the head 123 adjacent the gear 127. The gear 127, its hub 128 and the cover plate 129 have a central opening 133 through which the screw 117 freely extends. A cylindrical member 134 extends into the other end of the opening 124 and abuts the hub 128 to which it is firmly secured by screws 137. The cylindrical member 134 has an internally threaded opening 137 which snugly but slidably embraces the external threaded surface of the screw 117.

The heat 123 has a second opening 138 which is substantially parallel with and spaced sidewardly from the opening 124. However, the opening 138 communicates with the enlarged portion 126 of said opening 124 near the periphery thereof. In fact, the teeth of the gear 127 extends partially across the opening 138. A lock element 139 is slidably disposed within the opening 138 and is shaped for movement between a pair of teeth on the gear 127 (FIG. 12) whereby rotation of the gear, hence of the cylindrical member 134, is positively prevented. The end of the opening 138 remote from the plate 129 is internally threaded and a screw 142 is disposed therein. A spiral spring 143 is held under compression between the screw 142 and the lock element 139, which is urged by the spring 143 against the cover plate 129. An elongated release element 144 is secured to the lock element 139 and extends rearwardly therefrom through an opening 146 in plate 129 and projects rearwardly therebeyond. Thus, the lock element 139 can be disengaged from the gear 127 by manually urging the release element 144 frontwardly. The plate 129 is rigidly secured to the pusher plate 97 near the lower end thereof.

A gear 147 (FIGS. 5 and 9) is secured to the screw 117 adjacent the front bearing 118. A rack 148 is adjustably mounted upon the front right corner of the slide frame 51 in a horizontal position so that it extends lengthwise of the lower slide 52 for engagement by the gear 147 as the upper slide 79 approaches the rightward end of the lower slide 52. The rack 148 is adjustable in a lengthwise direction whereby the movement of the pusher plate 97 lengthwise of the trough 83 is adjusted.

The rack 148 is held against lengthwise movement by a toothed stop 151 which is mounted upon the lower end of the shaft 150, the other end of which is connected to the control knob 153. The shaft 150 slideably extends through a guide 155 which is rigidly secured to the cover plate 158 of the control cabinet 159. The stop 151 is urged downwardly into engagement with the rack 148 by a spiral spring 152 which is held under compression between the stop 151 and the guide 155. The stop 151 can be manually raised away from its rack holding position by grasping the control knob and lifting same.

When the stop 151 is raised away from the rack 148, said rack can be moved in a lengthwise direction by rotating the shaft 154 which is connected to a gear 156 continuously engaged with the rack 148. Rotation of the shaft 154 is effected by grasping the knob 157 secured therethrough.

A gear motor 165 (FIG. 4) is mounted within the slide frame 51 by means of motor brackets 166 and 167, so that the motor rotates around a substantially horizontal axis and the output shaft 168 of the gear box 169 extends vertically downwardly therefrom where it supports a sprocket 172. A shaft 173 is supported in an axially vertical position by the bearings 174 which are mounted upon a bearing support 176 secured to the frame 51 near the leftward end thereof. The sprocket 177 is secured to the lower end of the shaft 173 and connected by a chain 178 to the sprocket 172.

A substantially circular cam 179 is secured to the upper end of the shaft 173, said cam having a low dwell 182 and a high dwell 183 of approximately equal angular extents. A pair of rotary cam followers 184 and 185 are supported upon the front side member 53 and rear side member 54 of the lower slide 52 in approximately the same plane as the cam 179 for rotation around vertical axes. The cam followers 184 and 185 are positioned so that one is on the low dwell whenever the other is on the high dwell. Thus, the cam 179 is always in continuous, positive engagement with both cam followers at any given time. This provides more positive movement of the lower slide frontwardly and rearwardly relative to the frame 51.

A crank 187 (FIG. 5) is secured to the upper surface of the cam 179 and extends radially therefor. A connecting rod 188 is pivotally connected at one end to the crank 187 by a pivot pin 189 and is pivotally connected by the pivot pin 192 to the support bar 182. Thus, rotation of the cam 179 acts through the crank 187 and connecting rod 188 to effect reciprocating movement of the upper slide 79 relative to the lower slide 52.

A pair of clamps 193 and 194 are firmly but adjustably secured to the rear side of the slide frame 51 adjacent the opposite ends thereof for engagement with the front edge of the table 13 of the sawing machine 11.

A safety stop switch 161 is mounted upon the rear end plate 85 adjacent the screw 117 for engagement by the nut assembly 122 as it approaches the end plate 85 whereby the gear motor 165 is immediately de-energized. Thus, jamming of the equipment and/or movement of the pusher plate 97 into the path of the saw band is positively prevented.

ALTERNATE FEEDING MECHANISM

The structure including the support members 81 and 82, the trough 83, the pusher plate 97, the screw 117, the nut 122, the gear 127 and the rack 148 comprise one feeding mechanism 80 for advancing the meat toward the saw band 16. FIGS. 14 through 17 disclose an alternate feeding mechanism 201 in which the support member 202 is mounted upon shoes 77A and 78A which are supported respectively upon the slide guides 75A and 76A, about as discussed above with respect to the feeding mechanism 80.

The support member 202 includes a pair of rigid elongated side elements 203 and 204 which support elongated sprocket shafts 206 and 207 near their opposite ends for rotation around parallel, horizontal axes. An endless, chain type conveyor belt 208 extends around and is supported by sprockets 205 and 210 on the shafts 206 and 207, respectively. The upper reach 209 of the belt 208 extends between the sprockets 205 and 210, and is supported between its ends by an elongated plate 212 which is in turn supported upon and between the side elements 203 and 204.

The front sprocket shaft 206 extends into a gear box 214 which supports a shaft 216 the axis of which is perpendicular to and in the same horizontal plane as the axis of the shaft 206. The shaft 216 is drivingly connected to the shaft 206 by bevel gears 217, and a gear 218 is mounted on the front end of the shaft 216. A rack 219 is slidably supported within the gear box 214 directly below the gear 218 for engagement therewith, the movement of said rack 219 therefor being in a direction parallel with the shaft 206.

A spring 222 is held under slight compression between a stop 223 and the left end of the rack 219 whereby the rack is continuously urged rightwardly. The rack 219 is aligned with, and its right end is engageable by, the left end of the rod 224 which is adjustably mounted upon the upper slide 79A. By loosening the wing nut 226, the rod 224 which is threadably held in the bracket 227, can be moved leftwardly or rightwardly by rotating the control knob 228, after which the wing nut 226 is tightened. This adjustment effects control over the movement of the rack 219 when it engages the rod 224 and, therefore, controls the rotational movement of the front sprocket 205 which in turn effects the advancement of the upper reach 209 of the conveyor belt 208 toward the rear of the machine.

An elongated upright side plate 229 is mounted upon and extends upwardly from the slide element 204. The conveyor belt 208 has a plurality of sharpened pins 232 which project upwardly from the upper reach 209. The pins 232 project into the meat placed thereon for effecting controlled advancement of the meat by the conveyor belt.

An inverted U-shaped member 233 is secured to the side elements 203 and 204, approximately midway between the opposite ends thereof, and supports a hold down device 234 near one end thereof, which device resiliently and yieldably presses downwardly against the top of the meat being advanced by the conveyor belt 208. The rear end of the upper reach 209 is spaced from but close to the conveyor belt 22A supported upon the table 13A.

A stop plate 236 (FIGS. 14 and 15) is adjustably mounted upon the front side of the conveyor frame 24 in an upright position and is located directly in line with the upper reach 209 when the upper slide 79A is in its fully rightward position. Normally, the stop plate 236 is spaced from the saw band 16A a distance approximately equal to the desired thickness of the slice being cut, hence, the advancement of the meat effected by the upper reach 209 during each cycle of operation. A curved, upright guide plate 237 is also supported upon he conveyor frame 24A just to the left of the stop plate 236 and positioned so that it guides slices of meat as they are cut by the saw band onto the conveyor belt 22A.

OPERATION

Although the operation of the two embodiments of the invention disclosed herein will be apparent to persons skilled in the art, having read the preceding description, the operation of said embodiment will be briefly summarized hereinafter.

A piece of meat 15, such as a ham, a pork loin or the like, is placed in the trough 83 after the pusher plate 97 has been moved toward the frontward end of the trough. The meat 15 is placed firmly against the pusher plate 97 so that the pins 107 on the flange 106 engage the adjacent end of the meat. The clamps 108 and 109 are then moved downwardly into position where their pins engage the meat. The pusher plate is then moved rearwardly, until the rear end of the meat is adjacent the exposed portion 17 of the saw band 16. Thus, the pressure strips 116 will be engaged with the upper surface of the meat to hold it firmly in the trough, thereby resisting movement of the meat out of the trough. The rightward side of the trough is somewhat steeper than the left side in order to prevent the meat from rolling out of the trough during the cutting operation.

The sawing machine 11 is now energized, so that the saw band 16 is moving, and the conveyor motor 26 is energized so that the upper reach of the belt 22 is moving from right to left in FIG. 1. The rack 148 is adjusted by raising the stop 151 and manually turning the control knob 153 until the rotation of the screw 117 is set to advance the pusher plate 97 the precise distance required to obtain the slice thickness desired.

The gear motor 165 is then energized and the machine is now in automatic operation. That is, starting with the upper slide 79 in its rightward position and the lower slide 52 in its rearward position, the upper slide will first move leftwardly to the end of its stroke of movement followed by a frontward movement of the lower slide 52 relative to the slide frame 51. This is followed by a rightward movement of the upper slide relative to the lower slide, during the last part of which the rack 148 is engaged by the gear 147 thereby rotating the screw 117 which advances the pusher 97 the desired distance for cutting a slice of meat. The lower slide is now moved rearwardly relative to the slide frame causing gear 147 to disengage rack 148 and the first cycle of operation has been completed.

The second cycle will effect a cutting of a slice of meat as will each additional cycle until the gear motor is de-energized by the stop switch 161 when it is operated by the pusher plate.

The normal stopping position for the feeding machine 10, when the safety stop switch is operated, is with the upper slide 79 in its rightward and rearward position. Thus, the rack 148 will normally be engaged by the gear 147 when the machine stops, thereby preventing rotation of the screw 117. In order to move the pusher plate 97 frontwardly, to reload the trough with another piece of meat, it is first necessary to release the screw. This is done by urging the release element 114 (FIG. 11) leftwardly whereby the lock element is moved out of its locking position between a pair of teeth. The gear 127 and cylindrical member 134 secured thereto are now freely rotatable within the head 123. Accordingly, as the pusher plate 97 is now moved frontwardly, the nut assembly 122 does not oppose such movement. The spring 143 causes the lock element 139 to automatically engage between the teeth of the gear 137 during the next rotation of the screw 117 by the rack 148.

The operation of the feeding machine 10A having the alternate feeding mechanism 201 is identical with the operation of the feeding machine 10 insofar as the performance of the lower slide 52A and upper slide 79A are concerned. The primary difference resides in the operation of feeding mechanism 201 mounted thereon.

In the alternate feeding mechanism 201, the sprocket shaft 206 is rotated a predetermined amount by the rack 219 acting through the gears in the box 214 which drive the shaft 206. That is, each time the upper slide 79A approaches the rightward end of its movement, the rack 219 is moved by the rod 224 which ultimately results in the advancement of the upper reach 209 of the belt 208 a predetermined distance. This advancement of the meat is repeated with each cycle of movement of the upper and lower slides. One significant difference between the feeding mechanisms 81 and 201 resides in the fact that continuous loading of the feeding mechanism 201 is much easier. That is, as one piece of meat is moved toward the band saw, another one can be loaded on the conveyor ready to be sliced as soon as the first piece of meat has been completely sliced.

Although the stop plate 236 and guide plate 237 have been expressly disclosed in combination with the alternate feeding mechanism 201, it will be recognized that these two plates can be used in conjunction with the feeding mechanism 81.

The motor 165 (FIG. 4), the cam 179 and the linkage or drive elements therebetween can be replaced by other power producing means, such as fluid actuated power cylinders, to effect the quadrangular movement of feeding mechanism.

Although particular preferred embodiments of the invention have been disclosed in detail for illustrative purposes, it will be recognized that variations or modifications of the disclosed structures, including the rearrangement of parts, lie within the scope of the present invention.

The embodiments of the invention in which an exclusive property or privilege is claimed are defined as follows:

1. A machine for automatically feeding a product to severing means disposed in a substantially upright plane, comprising:
   base means having second elongated and horizontal guide means;
   second side means mounted on said second guide means for movement lengthwise thereof in a direction substantially perpendicular to said plane;
   first elongated and horizontal guide means extending perpendicularly to said second guide means in a direction substantially parallel to said plane, said first guide means being mounted upon and supported by said second slide means for movement therewith;
   support means having first slide means slidably mounted upon said first guide means for linear movements lengthwise thereof;
   actuating means including cam means movably supported by said base means and engaged with cam follower means mounted upon said second slide means for effecting periodic reciprocation of said second slide means along said second guide means in a direction substantially perpendicular to said plane;
   said acutating means further including a rotatable crank and link means connected between said rotatable crank and said first slide means for causing reciprocation of same along said first guide means in a direction substantially parallel to said plane;
   product advancing means movably mounted on said support means for moving said product along said support means in a direction toward and transverse of said plane; and
   drive means connected to said advancing means for effecting incremental and intermittent movement thereof relative to said support means, the operation of said drive means being responsive to said reciprocal movement of said support means whereby said advancing means is moved toward said plane a predetermined increment of distance during each complete reciprocation of said support means.

2. A machine for automatically feeding a product to severing means disposed in a substantially upright plane, comprising:

base means having elongated linear and horizontal guide means;

support means having slide means mounted upon said guide means for movement lengthwise thereof;

actuating means mounted on said base means and connected to said support means for reciprocating said support means along said guide means in a direction substantially parallel with said plane;

product advancing means on said support means for moving said product along said support means in a direction toward and transverse of said plane, said advancing means comprising an endless conveyor belt mounted on said support means and having a pair of spaced and substantially horizontal reaches extending substantially perpendicularly to said plane, said conveyor belt having gripping means projecting outwardly therefrom; and drive means connected to said advancing means for effecting incremental and intermittent movement thereof, operation of said drive means being responsive to said reciprocal movement of said support means whereby asid advancing means is moved toward said plane a predetermined increment of distance during each complete reciprocation of said support means;

said drive means including sprocket means drivingly engaged with said conveyor belt near one end of the reaches thereof, gear means connected to said sprocket means and rack means engaged with said gear means and adapted to be moved tangentially thereof as said support means approaches one end of its reciprocal movement whereby the upper reach of said conveyor belt is advanced a predetermined distance toward said plane.

3. A machine for automatically cutting slices from a large object, such as a piece of meat, comprising:

blade means supported for movement in a closed path, one portion of said path defining a cutting plane;

base means adjacent said blade means;

first slide means slidably mounted on said base means for relatively reciprocal movement in a first linear direction which is substantially perpendicular to said cutting plane;

second slide means slidably mounted on said first slide means for relative reciprocal movement in a second linear direction which is substantially perpendicular to said first direction and is substantially parallel to said cutting plane;

actuating means on said base means and drivingly connected to said first and second slide means for cyclically moving said second slide means through a closed, substantially rectangular path;

said actuating means including first and second drive means drivingly connected with said first and second slide means, respectively, for reciprocating same;

article advancing means mounted on said second slide means for moving an article toward said plane; and driving means coacting with said advancing means for effecting periodic, incremental movement of said advancing means toward said cutting plane.

4. A machine according to claim 3, wherein the relative linear movement in said first direction between said base means and said first slide means is relatively small, and wherein the relative linear movement in said second direction between said first slide means and said second slide means is relatively large.

5. A machine according to claim 3, wherein said second slide means has an upwardly opening, elongated article supporting trough mounted thereon and extending substantially perpendicularly to said plane;

wherein said advancing means includes a plate mounted on said trough and movable lengthwise therealong; and wherein said driving means includes an elongated screw rotatably mounted on and extending parallel with said trough, and nut means secured to said plate and threadably engaged with said screw.

6. A machine according to claim 3, wherein said article advancing means including an endless conveyor having a pair of spaced and substantially parallel reaches extending substantially perpendicularly to said plane; and wherein said driving means includes sprocket means connected to said conveyor near one end of the reaches thereof, said driving means being operated in response to each reciprocation of said second slide means to advance the upper reach of the conveyor a predetermined distance toward said plane.

7. A machine according to claim 3, wherein said second slide means has article support means mounted thereon, said article advancing means being mounted on said article support means for linear movement therealong in a direction toward said plane, and said driving means including gear means rotatably supported on said article support means and rack means mounted on said base means and intermittently engaged with said gear means for causing rotation of said gear means as said upper slide means approaches one end of the reciprocal movement of said second slide means.

8. A machine according to claim 3, wherein said blade means comprises a movable bandsaw support for movement in a closed path and having one portion thereof disposed within a substantially vertical plane, said portion of said bandsaw being positioned for cutting said object.

9. A machine according to claim 3, wherein said first slide means has opposed cam follower means mounted thereon, and wherein said first drive means includes rotatable cam means positioned between said cam follower means for causing periodic reciprocation of said first slide means, said rotatable cam means having a profile thereon for causing movement of said first slide means only when said second slide means is adjacent the end positions of its reciprocal movement; and said second drive means including rotatable crank means rotatable in unison with said cam means and drivingly interconnected to said second slide means for causing reciprocation thereof.

* * * * *